(12) United States Patent
Braun et al.

(10) Patent No.: US 11,501,154 B2
(45) Date of Patent: Nov. 15, 2022

(54) SENSOR TRANSFORMATION ATTENTION NETWORK (STAN) MODEL

(71) Applicants: SAMSUNG ELECTRONICS CO., LTD., Suwon-si (KR); UNIVERSITAET ZUERICH, Zurich (CH)

(72) Inventors: Stefan Braun, Saint-Louis (FR); Daniel Neil, Zurich (CH); Enea Ceolini, Zurich (CH); Jithendar Anumula, Zurich (CH); Shih-Chii Liu, Zurich (CH)

(73) Assignees: SAMSUNG ELECTRONICS CO., LTD., Suwon-si (KR); UNIVERSITAET ZUERICH, Zurich (CH)

( * ) Notice: Subject to any disclaimer, the term of this patent is extended or adjusted under 35 U.S.C. 154(b) by 1291 days.

(21) Appl. No.: 15/911,969

(22) Filed: Mar. 5, 2018

(65) Prior Publication Data

US 2018/0336466 A1 Nov. 22, 2018

Related U.S. Application Data

(60) Provisional application No. 62/508,631, filed on May 19, 2017, provisional application No. 62/507,385, filed on May 17, 2017.

(30) Foreign Application Priority Data

Sep. 13, 2017 (KR) .................. 10-2017-0117021

(51) Int. Cl.
*G06N 3/08* (2006.01)
*G06N 3/04* (2006.01)
(Continued)

(52) U.S. Cl.
CPC ............... *G06N 3/08* (2013.01); *G06K 9/627* (2013.01); *G06K 9/6293* (2013.01); *G06N 3/04* (2013.01);
(Continued)

(58) Field of Classification Search
CPC .. G06N 3/02; G06N 3/04; G06N 3/08; G06N 3/082; G06N 20/00; G06N 20/10;
(Continued)

(56) References Cited

U.S. PATENT DOCUMENTS 7,089,178 B2 8/2006 Garudadri et al.
7,620,546 B2 11/2009 Hetherington et al.
(Continued)

FOREIGN PATENT DOCUMENTS

EP 3143610 A1 3/2017

OTHER PUBLICATIONS

Nicolaou et al., Continuous Prediction of Spontaneous Affect from Multiple Cues and Modalities in Valence-Arousal Space, IEEE Transactions On Affective Computing, vol. 2, No. 2, Apr.-Jun. 2011 (Year: 2011).*

(Continued)

*Primary Examiner* — Shane D Woolwine
(74) *Attorney, Agent, or Firm* — Sughrue Mion, PLLC

(57) ABSTRACT

A sensor transformation attention network (STAN) model including sensors, attention modules, a merge module and a task-specific module is provided. The attention modules calculate attention scores of feature vectors corresponding to the input signals collected by the sensors. The merge module calculates attention values of the attention scores, and generates a merged transformation vector based on the attention values and the feature vectors. The task-specific module classifies the merged transformation vector.

22 Claims, 13 Drawing Sheets

(51) Int. Cl.
| | |
|---|---|
| *G10L 15/16* | (2006.01) |
| *G06K 9/62* | (2022.01) |
| *G06V 10/44* | (2022.01) |
| *G06V 20/10* | (2022.01) |
| *G06V 10/80* | (2022.01) |
| *G06V 10/764* | (2022.01) |
| *G10L 15/24* | (2013.01) |
| *G06V 10/82* | (2022.01) |

(52) U.S. Cl.
CPC .......... *G06V 10/454* (2022.01); *G06V 10/764* (2022.01); *G06V 10/811* (2022.01); *G06V 20/10* (2022.01); *G10L 15/16* (2013.01); *G06V 10/82* (2022.01); *G10L 15/24* (2013.01)

(58) Field of Classification Search
CPC .. G06N 20/20; G06K 9/00664; G06K 9/4628; G06K 9/627; G06K 9/6293; G10L 15/16; G10L 15/24; G06V 10/82; G06V 10/454; G06V 10/764; G06V 10/811
See application file for complete search history.

(56) References Cited

U.S. PATENT DOCUMENTS

| | | |
|---|---|---|
| 8,069,049 B2 | 11/2011 | Nilsson et al. |
| 8,972,316 B2 | 3/2015 | Nugent |
| 9,263,036 B1 | 2/2016 | Graves |
| 2007/0217693 A1 | 9/2007 | Kretzschmar Jr |
| 2015/0301796 A1* | 10/2015 | Visser ................... G10L 17/22 715/728 |
| 2016/0093313 A1 | 3/2016 | Vickers |
| 2016/0350655 A1 | 12/2016 | Weiss et al. |
| 2017/0024645 A1 | 1/2017 | Socher et al. |
| 2017/0124432 A1 | 5/2017 | Chen et al. |
| 2017/0127016 A1 | 5/2017 | Yu et al. |
| 2017/0339488 A1* | 11/2017 | Yoshida ................. H04R 3/005 |

OTHER PUBLICATIONS

Chiori Hori et al., "Attention-Based Multimodal Fusion for Video Description", Mar. 9, 2017, Retrieved from the Internet: URL:https://arix.org/pdf/1701.03126.pdf, XP55511750. (8 pages total).

Joon Son Chung et al., "Lip Reading Sentences in the Wild", Nov. 16, 2016, Retrieved from the Internet: URL:https://arxiv.org/pdf/1611.05358v1.pdf, XP55511754. (12 pages total).

Dzmitry Bahdanau et al., "Neural Machine Translation By Jointly Learning To Align and Translate", May 19, 2016, Retrieved from the Internet: URL:https://arxiv.org/pdf/1409.0473.pdf, XP055399692. (15 pages total).

Search Report dated Oct. 11, 2018 by the European Patent Office in counterpart European Patent Application No. 18169500.8.

Nam et al., "A Neural Network Model for Korean Open Information Extraction", 2016, The Korean Institute of Information Scientists and Engineers, 5 pages total, http://www.dbpia.co.kr/journal/articleDetail?nodeId=NODE07115917.

Communication dated Dec. 23, 2021 by the Korean Intellectual Property Office in Korean Patent Application No. 10-2017-0117021.

* cited by examiner

FIG. 4C

| Module | Attention on separately transformed sensor inputs |
|---|---|
| Classification C | $C_t$ |
| Sensor merge SM | $SM_t$ |
| Attention A, Transformation T | $A_t^1$ ← $T_t^{1a}$  $T_t^{1b}$   $A_t^S$ ← $T_t^{Sa}$  $T_t^{Sb}$ |
| Input I | $I_t^{s=1}$ ... $I_t^{s=S}$ |
| <u>Notation</u><br>time steps t=1..T<br>sensors s=1..S | All variants:<br>compute for all timesteps t=1..T |

SENSOR TRANSFORMATION ATTENTION NETWORK (STAN) MODEL

CROSS-REFERENCE TO RELATED APPLICATIONS

This application claims the benefit of U.S. Provisional Application No. 62/507,385 filed on May 17, 2017 and U.S. Provisional Application No. 62/508,631 filed on May 19, 2017 in the U.S. Patent and Trademark Office, and claims priority from Korean Patent Application No. 10-2017-0117021, filed on Sep. 13, 2017 in the Korean Intellectual Property Office, the disclosures of which are incorporated herein by reference in their entireties.

BACKGROUND

1. Field

Apparatuses consistent with exemplary embodiments relate to a sensor transformation attention network (STAN) model.

2. Description of the Related Art

To obtain information from an image, a person unconsciously focuses on certain points of the image. For example, a lighthouse may stand on an island out at sea. In this example, a person may unconsciously focus his or her "attention" on the lighthouse and the island to obtain the information of "there is a lighthouse on an island".

Inventors of the present Application have determined that by applying, to computer learning, this human processing skill to obtain information by focusing on a target or a portion of the target, recognition or processing performance of the computer may be improved.

SUMMARY

One or more exemplary embodiments may address at least the above issues and/or issues not described above. Also, the exemplary embodiments are not required to address the issues described above, and an exemplary embodiment may not address any issue described above.

According to an aspect of an exemplary embodiment, there is provided a sensor transformation attention network (STAN) model including sensors configured to collect input signals, attention modules configured to calculate attention scores of feature vectors corresponding to the input signals, a merge module configured to calculate attention values of the attention scores, and generate a merged transformation vector based on the attention values and the feature vectors, and a task-specific module configured to classify the merged transformation vector.

The input signals may include at least one of a raw signal corresponding to at least one of an audio feature and a visual feature and a preprocessed signal of the audio feature and the visual feature.

The input signals may be partitioned on a frame-by-frame basis based on a time series.

The sensors may include at least one of a plurality of sensors operating according to a same modality and a plurality of sensors operating according to different modalities.

The attention modules may further be configured to each calculate one scalar attention score per frame of the feature vectors.

The attention modules may correspond to the sensors, respectively, and the attention scores of the attention modules may have a negative correlation with respect to noise levels of the sensors.

The noise levels may be based on at least one of artificial noise and natural noise.

The attention modules may include any at least one of a fully-connected neural network (FCNN), a convolutional neural network (CNN), and a recurrent neural network (RNN).

The merge module may further be configured to calculate the attention values through sequence-to-sequence mapping on a time series, and generate the merged transformation vector.

The merge module may further be configured to generate the merged transformation vector by scaling the feature vectors based on the corresponding attention values, and merging the scaled feature vectors using an adding operation.

The task-specific module may include at least one of an FCNN, a CNN, and an RNN.

The task-specific module may include two layers of bidirectional GRUs and a long short term memory (LSTM).

The STAN model may further include transformation modules configured to transform the input signals to the feature vectors by mapping the input signals to a feature space.

The transformation modules may be connected to the attention modules and to the merge module.

The transformation modules may include at least one of an FCNN, a CNN, and an RNN.

The CNN may include a plurality of convolutional layers for transformation of the feature vectors, and max pooling layers corresponding to the plurality of convolutional layers, respectively.

The merge module may further be configured to generate the merged transformation vector by scaling the feature vectors based on the corresponding attention values, and merging the scaled feature vectors using an adding operation.

The transformation modules may be connected to the sensors and configured to receive the input signals together with the attention modules, respectively, and each transformation module may be connected to the merge module together with each corresponding attention module.

The transformation modules may include first transformation modules and second transformation modules configured to receive the input signals from the sensors, the first transformation modules may be connected to the attention modules, and the second transformation modules may be connected to the merge module.

The STAN model may be trained based on a training set in which noise sampled from normally and uniformly distributed random noise using a noise model is mixed with the input signals.

The noise model may include a random walk noise model, and the sensors may further be configured to each receive a unique, independently drawn noise signal per training sample based on the random walk noise model.

BRIEF DESCRIPTION OF THE DRAWINGS

The above and/or other exemplary aspects and advantages will be more apparent by describing certain exemplary embodiments with reference to the accompanying drawings, in which:

FIGS. 4A through 4C illustrate configurations of STAN models according to an exemplary embodiment;

DETAILED DESCRIPTION

Figure 1:
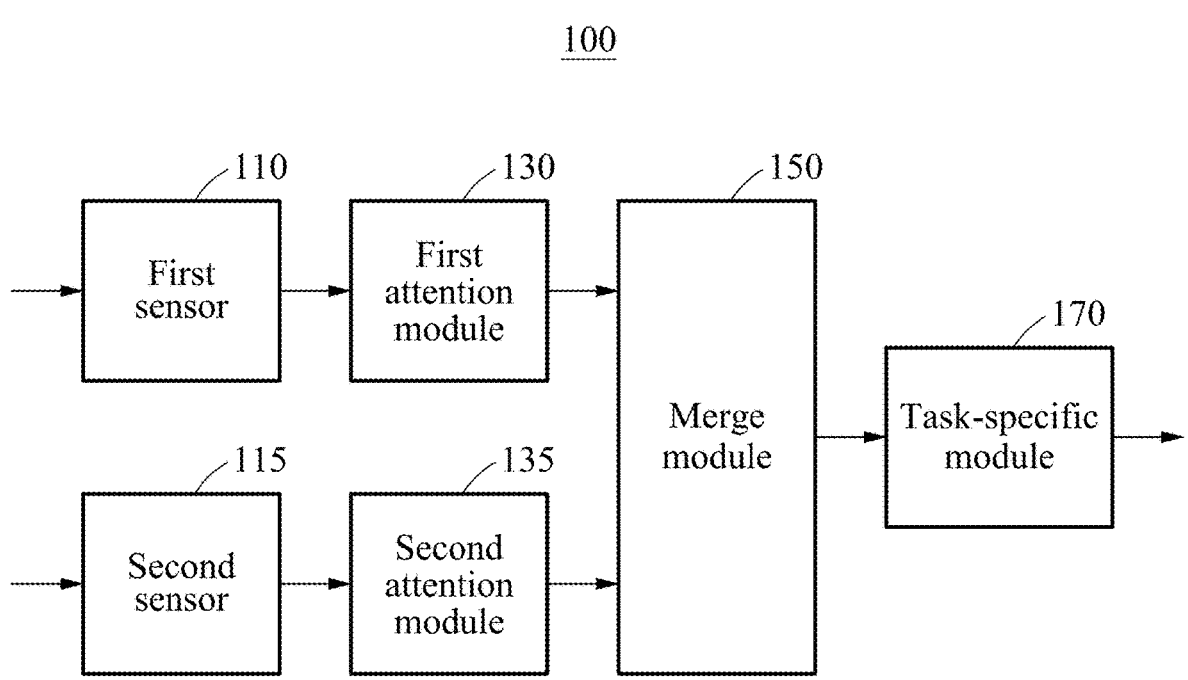
FIG. 1 is a block diagram illustrating a sensor transformation attention network (STAN) model according to an exemplary embodiment.

Reference will now be made in detail to exemplary embodiments which are illustrated in the accompanying drawings, wherein like reference numerals refer to the like elements throughout. Exemplary embodiments are described below in order to explain the present disclosure by referring to the figures.

The following structural or functional descriptions are merely exemplary to, and the scope of the exemplary embodiments is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Examples set forth hereinafter may be mounted on a vehicle, a television, a mobile phone, and other electronic devices, and used to provide, for example, speech recognition, image analysis, time series analysis, and natural language processing. The examples may be implemented as any of various types of products such as a personal computer, a laptop computer, a tablet computer, a smart phone, a smart home appliance, and a wearable device. Hereinafter, the examples will be described in detail with reference to the accompanying drawings, wherein like drawing reference numerals are used for like elements.

FIG. 1 is a block diagram illustrating a sensor transformation attention network (STAN) model according to an exemplary embodiment. Referring to FIG. 1, a STAN model 100 may include sensors 110 and 115, attention modules 130 and 135, a merge module 150, and a task-specific module 170.

The sensors 110 and 115 may collect input signals. Each of the sensors 110 and 115 may operate according to a modality, such as audio and video. A plurality of sensors may operate according to each modality.

The input signals may include any one or any combination of a raw signal corresponding to any one or any combination of an audio feature and a visual feature, and a preprocessed signal of the audio feature and the visual feature. In this example, the preprocessed signal may be a preprocessed signal of the audio feature or a normalized signal of the visual feature. The input signals may be partitioned on a per-frame basis based on a time series.

The sensors 110 and 115 may include any one or any combination of a plurality of sensors having the same modality and a plurality of sensors having different modalities. For example, the first sensor 110 may be an audio sensor configured to sense an audio feature, and the second sensor 115 may be an optical sensor configured to sense an optical feature. In another example, both the first sensor 110 and the second sensor 115 may be audio sensors configured to sense audio features, or optical sensors configured to sense optical features. For ease of description, FIG. 1 illustrates only two sensors, the first sensor 110 and the second sensor 115. However, examples are not limited thereto. The STAN model 100 may further include a number of other sensors. In an example, the multiple sensors included in the STAN model 100 may have a concatenated architecture.

The attention modules 130 and 135 may calculate attention scores of feature vectors corresponding to the input signals. In this example, the attention scores may correspond to the sensors 110 and 115, respectively. The attention modules 130 and 135 may each calculate one scalar attention score per frame of the feature vectors. The attention modules 130 and 135 may convert the feature vectors to one scalar attention score per frame by using a non-flattening dense layer with or without non-linearity.

Figure 5C:
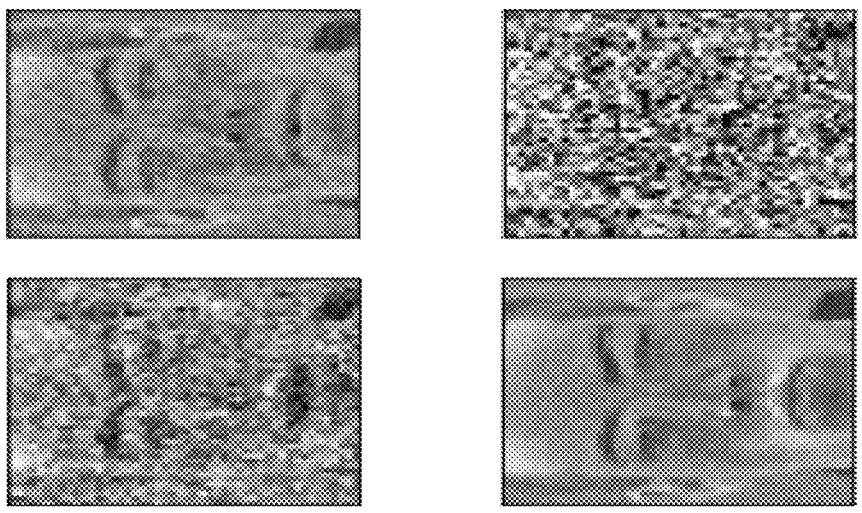
FIGS. 5A through 5C illustrate random walk noise added while training a STAN model according to an exemplary embodiment.
Figure 5B:
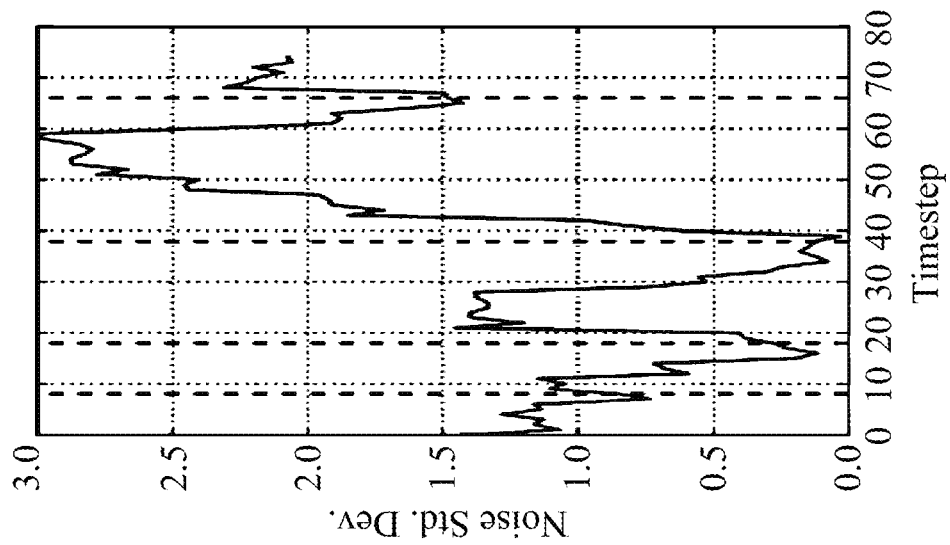
Figure 5A:
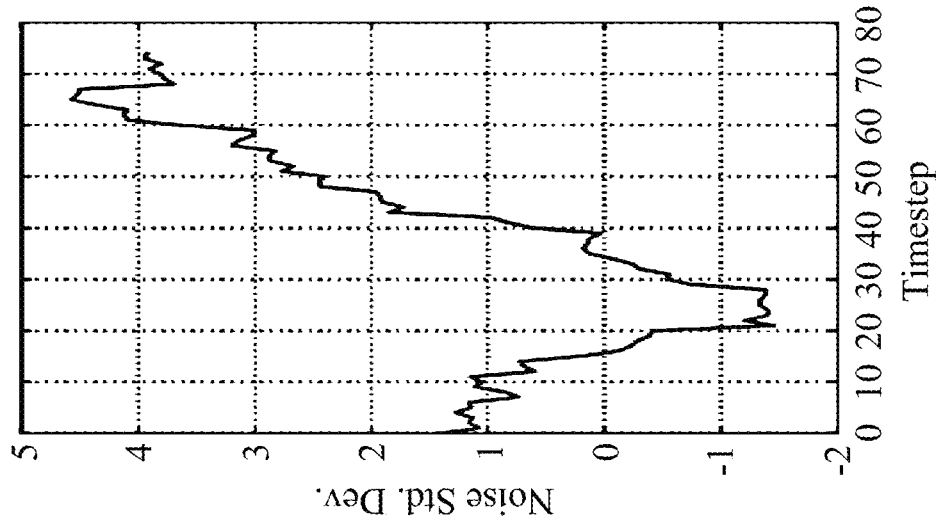

The attention modules 130 and 135 may correspond to the sensors 110 and 115, respectively. The attention scores of the attention modules 130 and 135 may have a negative correlation to noise levels of the sensors 110 and 115, as shown in FIGS. 5A through 5C. For example, as the noise levels of the sensors 110 and 115 increase, the attention scores of the attention modules 130 and 135, corresponding to the sensors 110 and 115, respectively, may decrease. As the noise levels of the sensors 110 and 115 decrease, the attention scores of the attention modules 130 and 135 may increase. In this example, the noise levels may be based on any one or any combination of linear noise sweeps, noise bursts, and sinusoidal noise.

The attention modules 130 and 135 may include, for example, gated recurrent units (GRUs).

The merge module 150 may calculate the attention values of the attention scores, and generate a merged transformation vector based on the attention values and the feature vectors. The merge module 150 may calculate the attention values through sequence-to-sequence mapping on a time series, and thereby generate the merged transformation vector. The merge module 150 may calculate the attention values by performing a softmax operation on the attention scores. The attention values may be calculated on a per-frame basis.

The merge module 150 may generate the merged transformation vector by scaling the feature vectors based on the corresponding attention values, and merging the scaled feature vectors using an adding operation.

The task-specific module 170 may classify the merged transformation vector. The task-specific module 170 may include any one or any combination of GRUs and a long short term memory (LSTM). The task-specific module 170 may include, for example, two layers of bidirectional GRUs.

Figure 2:
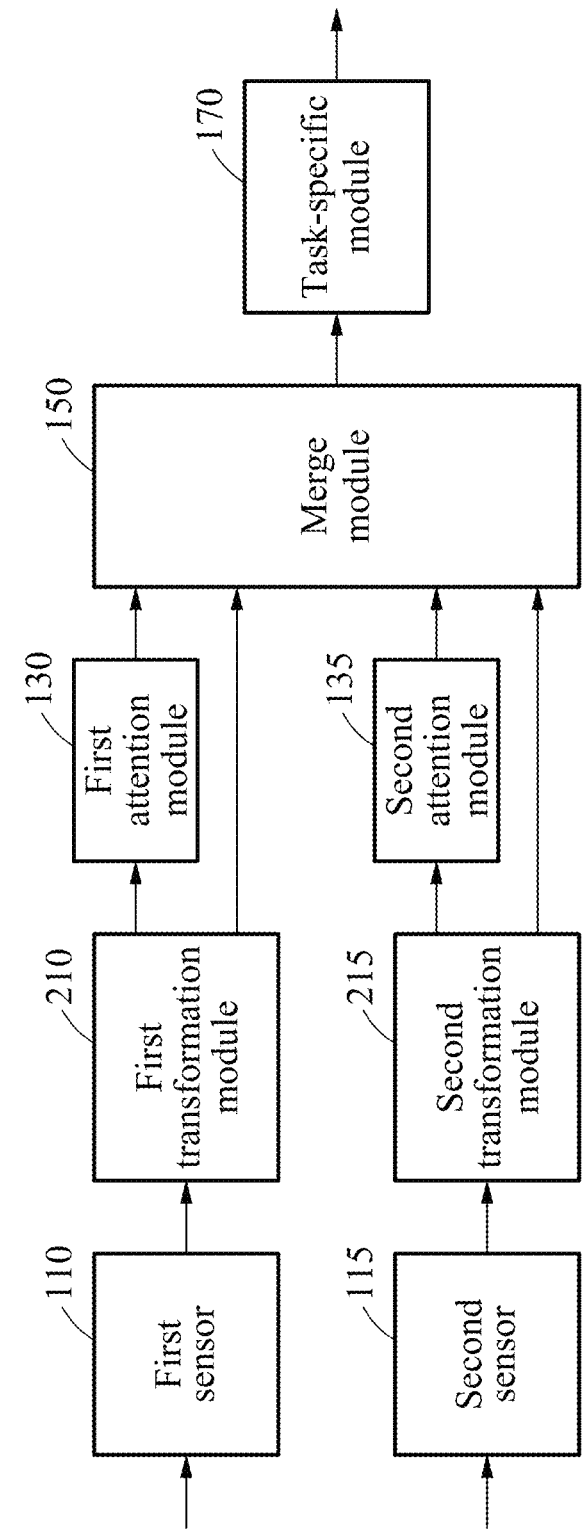
FIG. 2 is a block diagram illustrating a STAN model according to an exemplary embodiment.

FIG. 2 is a block diagram illustrating a STAN model according to another exemplary embodiment. Referring to FIG. 2, a STAN model 200, in which transformation modules 210 and 215 are further added to the architecture of FIG. 1, is illustrated.

The transformation modules 210 and 215 may transform input signals to feature vectors by mapping the input signals to a feature space. The transformation modules 210 and 215 may be connected to the attention modules 130 and 135 and to the merge module 150. For example, the first transformation module 210 may be connected to the first attention module 130, and also directly to the merge module 150. Further, the second transformation module 215 may be connected to the second attention module 135, and also directly to the merge module 150. In this example, outputs of the attention modules 130 and 135 may be attention scores. The feature space may be shared across different modalities. The transformation modules 210 and 215 may flexibly include multiple layers. The transformation modules 210 and 215 may also be omitted if unnecessary for a predetermined task. In a case in which the transformation modules 210 and 215 are omitted, the sensors 110 and 115 may be connected directly to the attention modules 130 and 135, as shown in FIG. 1.

The transformation modules 210 and 215 may include any one or more of GRUs for an audio feature of the input signals and a convolutional neural network (CNN) for a visual feature of the input signals. In this example, the CNN may include a plurality of convolutional layers for transformation of the feature vectors, and max pooling layers corresponding to the plurality of convolutional layers, respectively.

As shown in FIG. 2, in a case in which the STAN model 200 further includes the transformation modules 210 and 215, the merge module 150 may generate the merged transformation vector by scaling the feature vectors based on the corresponding attention values, and merging the scaled feature vectors using an adding operation.

The merge module 150 may generate the merged transformation vector by calculating and applying a scaling value for each sensor through the attention scores (the outputs of the attention modules 130 and 135) obtained for the sensors 110 and 115, respectively, and performing an adding operation thereon.

The STAN model 200 may partition the input signals on a per-frame basis based on a time series. The transformation modules 210 and 215 may transform the partitioned input signals to the feature vectors by mapping the input signals to a feature space. The transformation modules 210 and 215 may depend on input modalities of the sensors 110 and 115.

Like the STAN model 100 of FIG. 1 or the STAN model 200 of FIG. 2, the STAN model may support multi-modal and/or multi-sensor inputs in which each sensor is autonomously connected to attention modules and transformation modules.

The STAN model 100 of FIG. 1 and/or the STAN model 200 of FIG. 2 may be trained based on a training set in which noise sampled from normally distributed random noise using a random walk noise model is mixed with the input signals. In this example, the sensors 110 and 115 may each receive a unique, independently drawn noise signal per training sample based on the random walk noise model.

Through this, the STAN model according to an exemplary embodiment may robustly process data in the presence of noise, allow network reuse, and prevent a large increase in parameters as more sensory modalities are added. By training the STAN models 100 and 200 using random walk noise, the STAN model may dynamically focus attention on the sensors with more informative inputs or with a lower noise level. Further, a noise type based on the random walk noise may enable an attention mechanism of the STAN model to generalize noise statistics not seen during training.

The STAN model may process multi-modal temporal sequences with numerous and possibly redundant sensory modalities. The STAN model may enable a network to be extended easily to multiple sensors by its modular organization, and therefore may be applied to tasks requiring multi-modal and multi-sensor integration.

Figure 3:
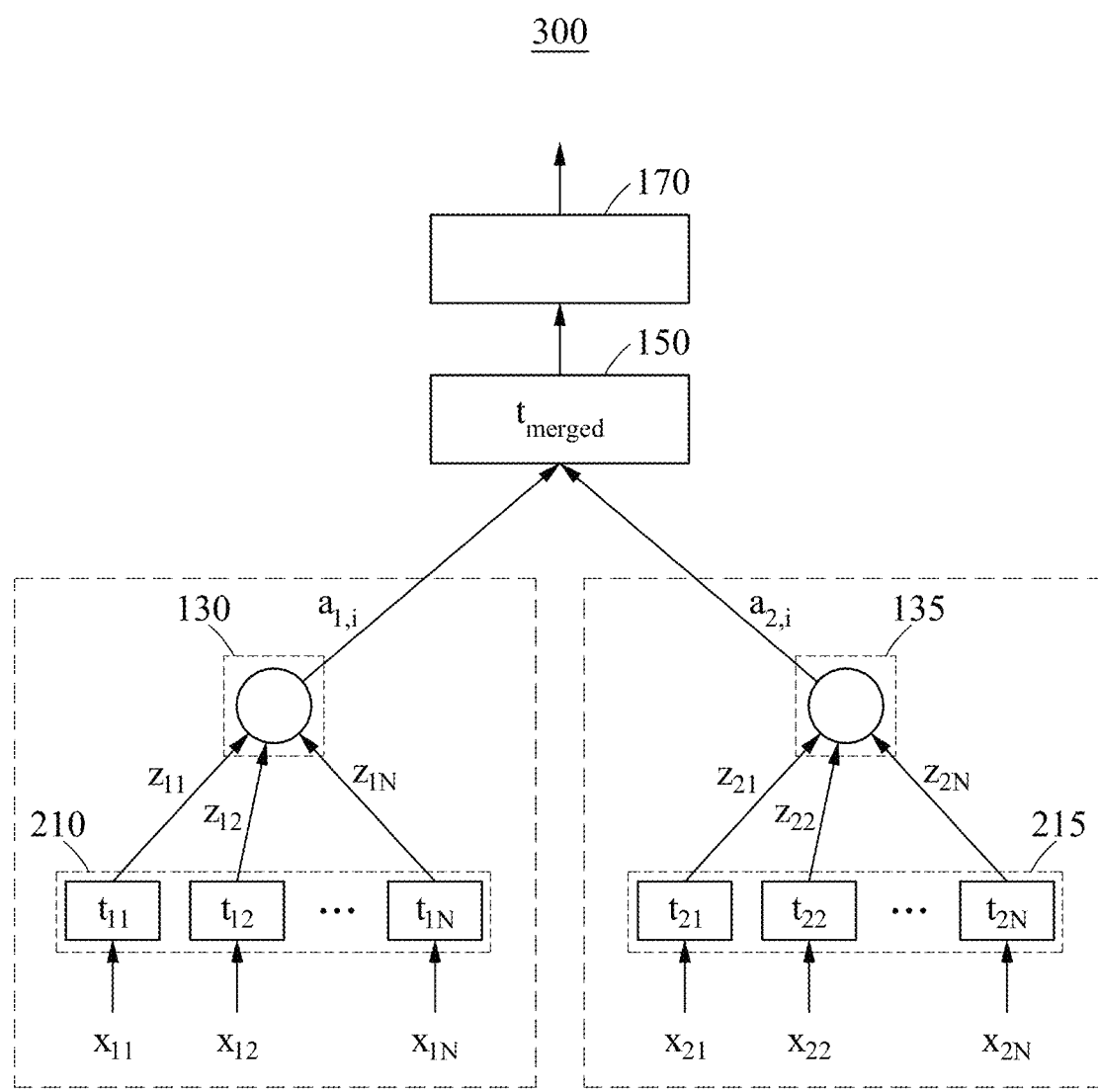
FIG. 3 illustrates a configuration of a STAN model according to an exemplary embodiment.

FIG. 3 illustrates a configuration of a STAN model according to an exemplary embodiment. Referring to FIG. 3, a STAN model 300 may apply a sequence of input signals $(X_{11}, X_{12}, \ldots, X_{1N})$ collected by the first sensor 110 to the first transformation module 210, and apply a sequence of input signals $(X_{21}, X_{22}, \ldots, X_{2N})$ collected by the second sensor 115 to the second transformation module 215. In this example, the input signals may be continuously applied or may be input over time. The first transformation module 210 and the second transformation module 215 may each extract features of the input signals using a CNN each time new input signals are applied, and may transform the extracted features into feature vectors (or may generate feature vectors) by mapping the extracted features into a feature space. The first transformation module 210 may transform the input signals $(X_{11}, X_{12}, \ldots, X_{1N})$ into feature vectors $(t_{11}, t_{12}, \ldots, t_{1N})$. Further, the second transformation module 215 may transform the input signals $(X_{21}, X_{22}, \ldots, X_{2N})$ into feature vectors $(t_{21}, t_{22}, \ldots, t_{2N})$. In this example, the input sequence of the feature vectors may be obtained, for example, using a bidirectional LSTM, a GRU, or a CNN based encoder.

The feature vectors may be applied to the attention modules 130 and 135. The attention modules 130 and 135 may calculate attention scores ($z_{11}, z_{12}, \ldots, z_{1N}, z_{21}, z_{22}, \ldots z_{2N}$) of the feature vectors ($t_{11}, t_{12}, \ldots, t_{1N}, t_{21}, t_{22}, \ldots, t_{2N}$). An attention mechanism of the attention modules 130 and 135 may be implemented using attention scores of the entire input sequence. In an example, the attention scores may be used for a sensor network to focus on a most significant feature to predict a subsequent word to be output. In this example, the attention scores may be related to individual input sequences.

The attention mechanism may improve performance as part of an encoder-decoder based sequence-to-sequence framework for applications such as image captioning, speech recognition, and machine translation. For example, dynamic shifting attention, for example, on a lower level of representation such as salient parts of an image may help a STAN in image captioning with respect to various different benchmark datasets.

Further, an attention-based recurrent sequence generator network may replace the hidden Markov model (HMM) typically used in a large vocabulary continuous speech recognition system. Thus, in a case of using the attention-based recurrent sequence generator network, an HMM-free recurrent neural network (RNN)-based network that is trained for end-to-end speech recognition may be configured. The attention mechanism may be applied to both spatial features and temporal features, and may be used for selection attention for multiple sensors having the same modality or sensors having different modalities.

The merge module 150 may generate a merged transformation vector $t_{merged}$ based on attention values $a_i$ of the attention scores and the feature vectors.

The task-specific module 170 may include, for example, two layers of bidirectional GRUs or an LSTM decoder.

In an example, the STAN model may include a pool of N sensors $s_i$, where i=1, . . . , N. The STAN model may generate a feature vector $f_i$ each time a new input is presented to the sensors. The transformation modules 210 and 215 may transform the feature vector $f_i$ to a transformed feature vector $t_i$. In this example, a new transformed feature vector $t_i$ is generated for each sensor at each time on a per-frame basis. For example, in a case in which feature vectors of the first sensor 110 and the second sensor 115 at a time T0 are t1$i$ and t2$i$, attention scores z1$i$ and z2$i$ is generated from the feature vectors, respectively. The STAN model may perform merging based on the attention scores.

The STAN model may calculate attention values $a_i$ by performing a softmax operation on attention scores $z_i$, as expressed by Equation 1.

$$a_i(z) = \frac{\exp(z_i)}{\sum_{k=1}^{K} \exp(z_k)}, K = N \quad \text{[Equation 1]}$$

Each transformed feature vector $t_i$ may be scaled by the corresponding attention value $a_i$ and merged by an adding operation, as expressed by Equation 2.

$$t_{merged} = \sum_{i=1}^{N} a_i \cdot t_i \quad \text{[Equation 2]}$$

The merged transformation vector $t_{merged}$ may be presented to the task-specific module 170 for classification.

The above process may compensate for a signal quality that varies over time due to noise, sensor failure, or other factors. Thus, the STAN model may direct attention to a sensor providing the best signal quality.

A convenient and highly successful way to handle time series is the use of RNNs. For this reason, the attention modules 130 and 135 and the task-specific module 170 may include GRUs. The transformation modules 210 and 215 may depend on input modality, with GRUs being a good choice for audio features and CNNs well adapted for images (temporal features).

Figure 4A:
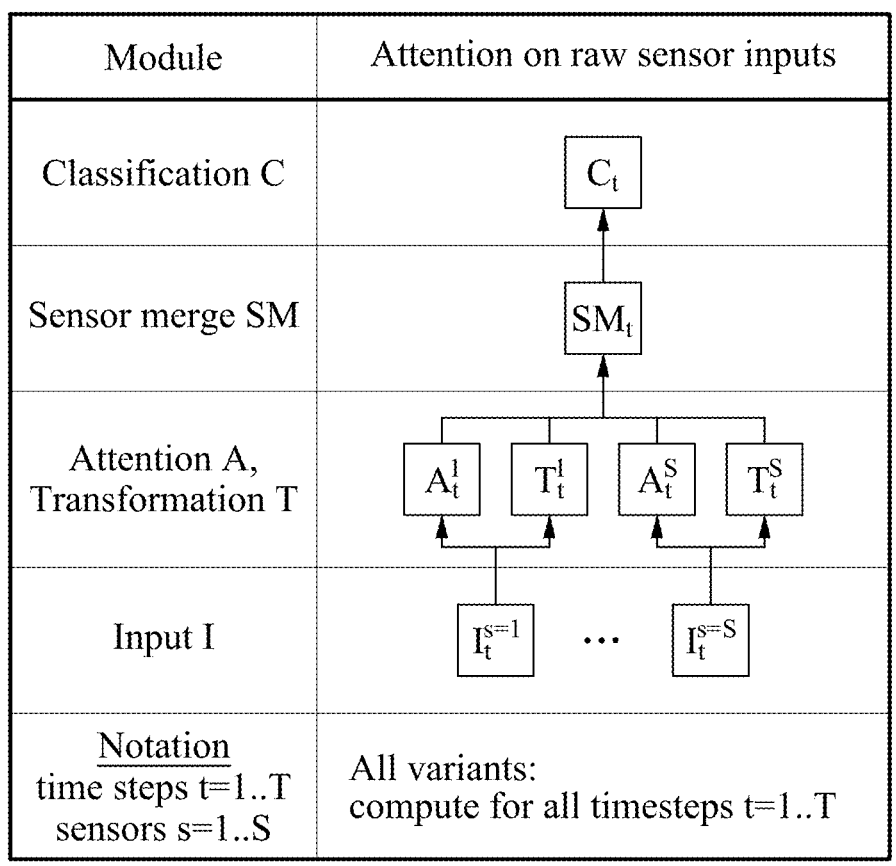
Figure 4B:
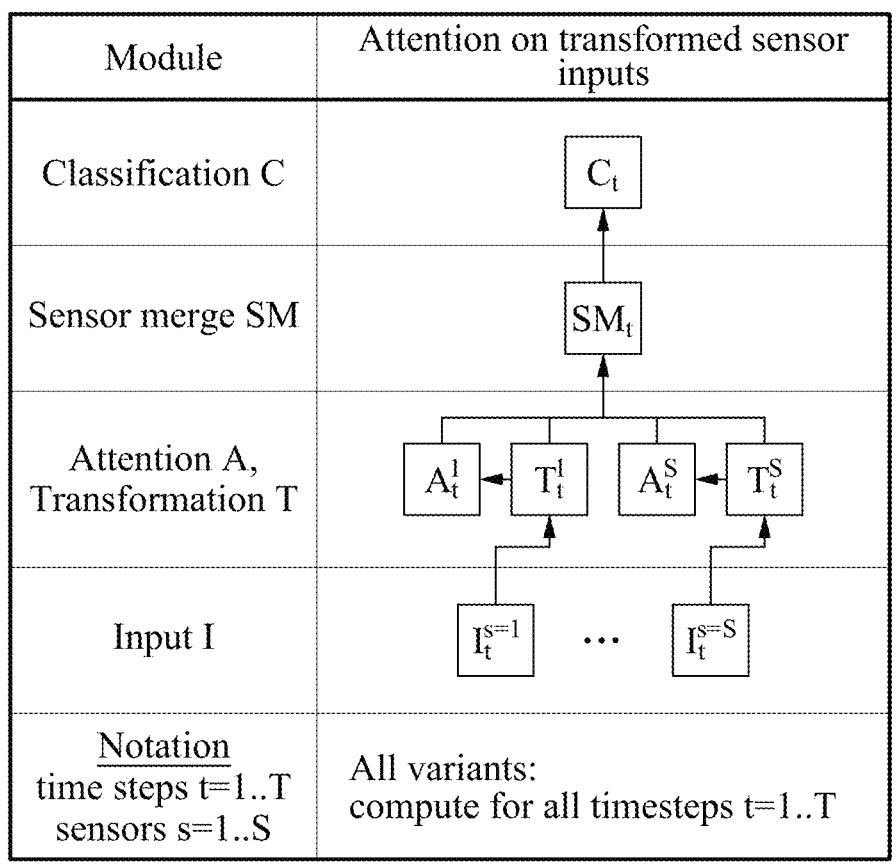

FIGS. 4A through 4C illustrate configurations of STAN models according to an exemplary embodiment. STAN models may each include five basic modules. For example, the STAN models may each include input sensors I, transformation modules T, attention modules A, a sensor merge module SM, and a task-specific module (for example, classification module C or regression module).

Referring to FIG. 4A, a STAN model with attention on raw sensor inputs is illustrated. In the STAN model of FIG. 4A, the transformation modules may be connected to the input sensors and receive input signals together with the attention modules, respectively. In this example, each transformation module and each corresponding attention module may be connected to the merge module.

Referring to FIG. 4B, a STAN model with attention on transformed sensor inputs is illustrated. The STAN model of FIG. 4B is the same as the STAN model 200 of FIG. 2, and thus references may be made thereto.

Referring to FIG. 4C, a STAN model with attention on separately transformed sensor inputs is illustrated. In the STAN model of FIG. 4C, the transformation modules may include first transformation modules and second transformation modules configured to receive input signals from the input sensors. The first transformation modules may be connected to the attention modules, and the second transformation modules may be connected to the merge module.

Architectures of the STAN modules may be suitable for tasks like multi-channel speech recognition with smartphones/tablets or tasks requiring multi-sensor integration such as autonomous driving/flying. The architectures of the STAN models may support arbitrary numbers of multi-sensor as well as multi-modal inputs and may embed an attentional mechanism for sensor selection.

The modular network architecture of the STAN models with flexible configurations of the attention modules and the transformation modules of FIGS. 4A through 4C may enable flexible computation of attention weights on the raw sensor inputs or the transformed sensor inputs.

The STAN models may not be limited to simple attention models with a single nonlinearity. The STAN models may be designed with arbitrary complexity, resulting in the possibility of simple and sophisticated attention models that benefit from the modeling power of an arbitrary number of nonlinearities.

The attention modules of the STAN models are designed in an independent modular fashion, enabling a user to compute attention weights without running the whole model. Thus, different modules of the STAN models may be computed separately. For example, if an output of one sensor is desired, the whole model may not have to be computed.

In addition, the STAN models may provide high interpretability of the attention weights, as the STAN models may be directly attributed to input time steps.

In the STAN models, the number of input sensors may be arbitrary. The transformation module, the attention module, and the classification module may include any type of function that fulfils the purpose of the module.

These functions may be implemented by, for example, a fully-connected neural network (FCNN), a convolutional neural network (CNN) or a recurrent neural network (RNN). The transformation modules and the attention modules may use shared or separate instances for each sensor.

The modules of FIGS. 4A through 4C and functions thereof may be described in Table 1.

TABLE 1

| Module | Function |
| --- | --- |
| Input sensor | Provide input data, e.g. time-series audio or video data. |
| Transformation module | Transform raw sensor inputs into different representation or keep raw sensor inputs (identity transformation). In this example, the transformed representation may have the same dimensionality across all sensors to enable merge process. |
| Attention module | Compute attention scores for each sensor based on raw sensor inputs or transformed sensor output. |
| Merge module | (1) Compute attention weights by normalizing attention scores across sensors to range between 0 and 1.<br>(2) Scale transformed sensor inputs by multiplication with attention weights.<br>(3) Merge scaled transformed sensor inputs by addition into common representation. |
| Task-specific module | Solve desired task on merged representation. |

FIGS. 5A through 5C illustrate random walk noise added while training a STAN model according to an exemplary embodiment. FIG. 5A is a graph in which a cumulative sum of a sequence of random variables forms a random walk. FIG. 5B is a graph in which the random walk is bounded after a reflection operator $\phi$ is applied.

FIG. 5C illustrates four panels that visualize noise drawn at each time point. Each panel may represent a video frame that is normalized from GRID corpus, zero-mean, and unit-variance normalized and mixed with a Gaussian noise source whose standard deviation corresponds to a vertical broken line of FIG. 5B.

The STAN model may be trained using a random noise model so as to be robust against a wide variety of noise types. The random noise model may have a uniform coverage of noise level, for example, over a range $[0, \sigma_{max}]$, and no settle-in time that may introduce a sequence length dependence on the noise.

For example, a standard deviation of noise a with respect to an input sequence of a time step t may be calculated as expressed by Equation 3.

$$\sigma(t) = \phi\left(\sigma 0 + \underbrace{\sum_{i=1}^{t} \text{sgn}(s_i)n_i}_{a}, \sigma_{max}\right),$$ [Equation 3]

$\sigma_0 \sim u(0, \sigma_{max}/2), s_i \sim u(-1, 1)\, n_i \sim \Gamma(k, \theta)$ In Equation 3, $\sigma_0$ may be distributed uniformly over a range $[0, \sigma_{max}/2]$. Further, $n_i$ may be induced from a gamma distribution having a shape k and a scale θ. A signum function may extract a positive sign and a negative sign from $s_i$ with the same probability. A parameter search during an experiment may calculate $\sigma_{max}=3$, k=0.8, and θ=0.2 as a set of appropriate parameters. A reflection function $\phi(a, \sigma_{max})$ may be expressed by Equation 4.

$$\phi(a, \sigma_{max}) = \sigma_{max} - |\text{mod}(a, 2\sigma_{max}) - \sigma_{max}|$$ [Equation 4]

In Equation 4, $\text{mod}(a, 2\sigma_{max}) = a - 2\sigma_{max}\lfloor a/2\sigma_{max}\rfloor$ may maintain values within a desired range $(0, 2\sigma_{max})$, and a subsequent shift and magnitude operations may map the values to a range $[0, \sigma_{max})$ while avoiding discontinuities.

Finally, input data x at a feature index k and a time index t may be mixed with noise sampled from a normal distribution, as expressed by Equation 5.

$$X_{k,t} = X_{k,t} + n_{k,t}, n_{k,t} \sim N(0, \sigma^2(t))$$ [Equation 5]

The reflection function $\phi(a, \sigma_{max})$ may be performed similarly to a mod operator. However, at edges, the reflection function $\phi(a, \sigma_{max})$ may generate a continuous reflection about the edges instead of a discontinuous wrap. Thus, the reflection function may form a constrained random walk, limited by $\sigma_{max}$, and the constrained random walk may be a standard deviation of normally distributed random noise added to the input x at the feature index k and the time point t.

The noise level varies over time, and allows periods of low noise (high attention desired) and high noise (low attention desired). Thus, the random noise model may generate sequences that provide a useful training ground to tune the attention mechanism of a STAN model.

Noise Experiments

In an example, noise experiments may be performed using three commonly-used datasets to show the performance of the STAN model with respect to sensors with dynamically changing noise levels. The three datasets may be, for example, TIDIGITS, Wall Street Journal (WSJ), and GRID datasets. First, a noise experiment using the TIDIGITS dataset will be described.

Dataset

The TIDIGITS dataset may be used as an initial evaluation task to demonstrate a response of an attention signal to different levels of noise in multiple sensors. The TIDIGITS dataset includes only audio data, and was designed for automatic speech recognition of connected digit sequences. A vocabulary may include 11 digits ("oh", "0", and "1" to "9"). Speakers may utter sequences of from one to seven digits in length, for example, "1-3-7" or "5-4-9-9-8".

The dataset may be partitioned into a training set of 8,623 samples and a test set of 8,700 samples. Raw audio data may be converted into Mel-frequency cepstral coefficients (MFCCs) features. A frame size of 25 milliseconds (ms), a frame shift of 10 ms, and 12 Mel spaced filter banks may be applied during feature extraction. Finally, an energy term as well as first and second order delta features may be appended, resulting in a 39-dimensional feature vector per frame. The delta features may be zero-mean and unit-variance normalized on the whole dataset.

A phrase error rate (PER) may be used as a performance metric. The PER may be defined as the number of correctly transcribed digit sequences C over the number of all sequences A, that is, as expressed by PER [%]=C/A. An error measure using the PER is a tough error measure that penalizes every sequence with false label insertions, deletions, or substitutions.

Models

A total of five models were evaluated for TIDIGITS, an a summary is shown in Table 1. As shown in Table 2, a task-specific module may include the same two-layer unidirectional (150,100) GRU network for all models. A baseline model may include a single audio sensor which is connected directly to the task-specific module. Two models may use a STAN architecture with two or three audio sensors.

TABLE 2

| Name | Architecture | Sensors | Transformation layers | Attention layers | Classification layers | # Parameters |
|---|---|---|---|---|---|---|
| Single Audio | Baseline | 1 Audio | None | None | (150,100) GRU | 162262 |
| Double Audio STAN | STAN | 2 Audio | None | (20) GRU | (150,100) GRU | 169544 |
| Triple Audio STAN | STAN | 3 Audio | None | (20) GRU | (150,100) GRU | 173185 |
| Double Audio Concat | Concatenation | 2 Audio | None | None | (150,100) GRU | 179812 |
| Triple Audio Concat | Concatenation | 3 Audio | None | None | (150,100) GRU | 197362 |

Attention modules may include 20 GRUs, and outputs thereof may be converted to one scalar attention score per frame by a non-flattening dense layer without non-linearity.

In order to evaluate a potential benefit of the STAN architecture, the STAN architecture may be compared to two simpler sensor concatenation models. The sensor concatenation models may each have two to three audio sensors, and inputs of the audio sensors may be concatenated and presented directly to task-specific modules, without using the transformation modules and the attention modules. In this example, none of the models may use transformation modules.

The number of parameters is roughly equal for all models, and depends only on an amount of input sensors. As the number of GRUs in the task-specific module is the same, a fair comparison may be obtained.

Training

Connected digit sequences may consider a sequence-to-sequence mapping task. In order to automatically learn alignments between speech frames and to label sequences, a connectionist temporal classification (CTC) objective may be adopted. All models may be trained with an ADAM optimizer for a maximum of 100 epochs, with early stopping to prevent overfitting.

All models may be trained on a noisy training set corrupted by a random walk noise model. A noise level of random walk noise may vary between $[0, \ldots, 3]6$.

Results

An attention mechanism may work across multiple noise types. Further, the STAN model may be an improvement on feature concatenation models in terms of error rate. The attention mechanism of STAN models may be first evaluated against random walk noise.

Figure 6A:
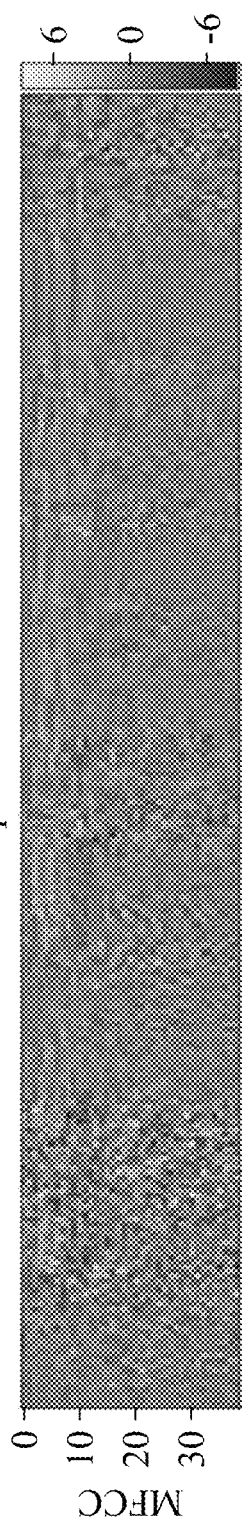
FIGS. 6A through 6C illustrate an attention response of a double audio STAN model with two audio sensors according to an exemplary embodiment.
Figure 6B:
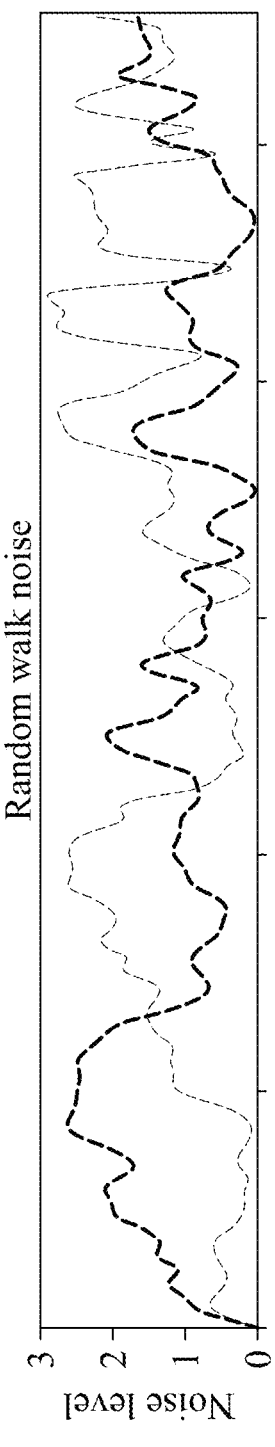
Figure 6C:
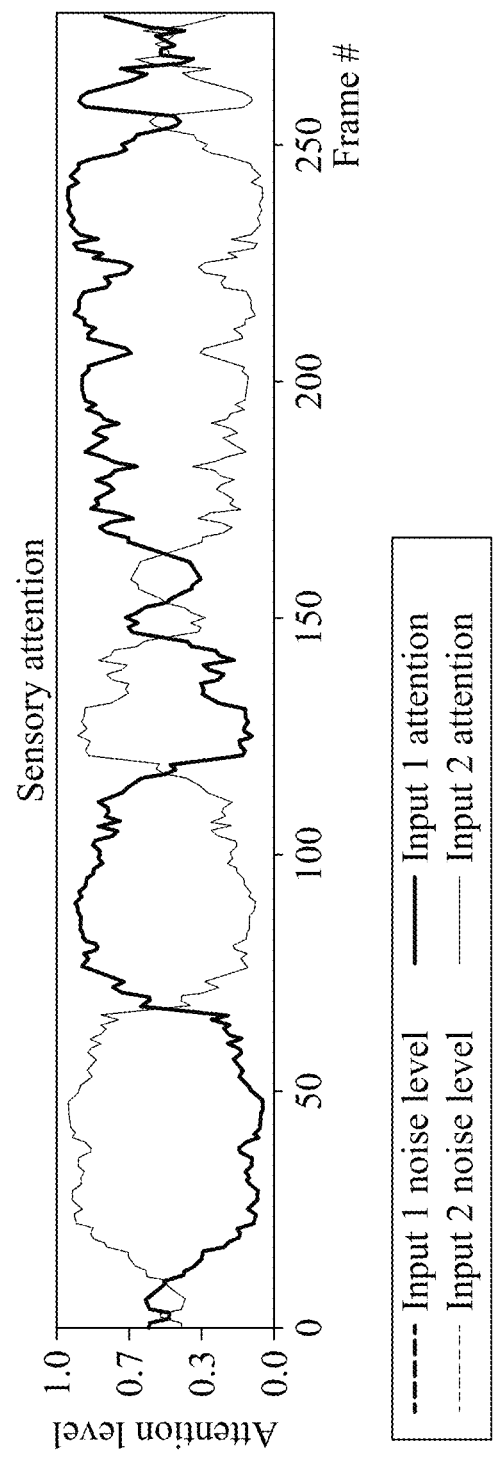

FIGS. 6A through 6C illustrate an attention response of a double audio STAN model with two audio sensors according to an exemplary embodiment. Referring to FIGS. 6A through 6C, attention responses to random walk noise conditions of a double audio STAN model trained using the TIDIGITS dataset are illustrated.

FIG. 6A illustrates noisy input features. FIG. 6B illustrates noise levels applied to two audio sensors, and FIG. 6C illustrates attention values for the two audio sensors.

A sample of a testset may be corrupted by random walk with a noise level between $[0, \ldots, 3]\sigma$. As shown in FIGS. 6B and 6C, the double audio STAN model may show a desired negative correlation between noise level and attention. When a noise level for a sensor increases, the attention paid to the same sensor may degrease. As the noise levels interleave over time, the attention mechanism may switch between sensors by a delay of 1-5 frames.

The double audio STAN model may also be evaluated against other noise types not seen during training of FIGS. 6A through 6C.

Figure 7A:
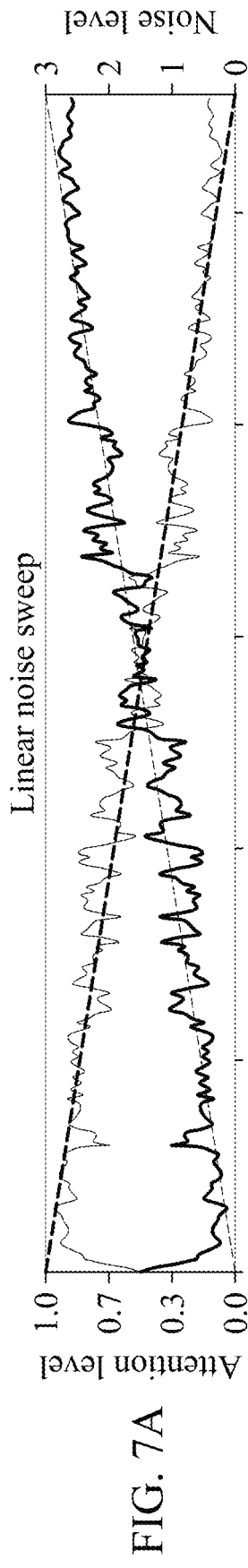
FIGS. 7A through 7C illustrate noise types not seen while training the double audio STAN model of FIGS. 6A through 6C.
Figure 7B:
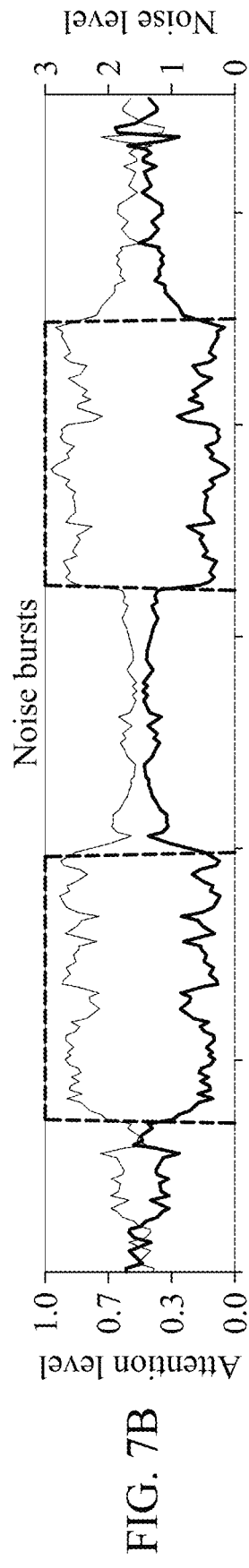
Figure 7C:
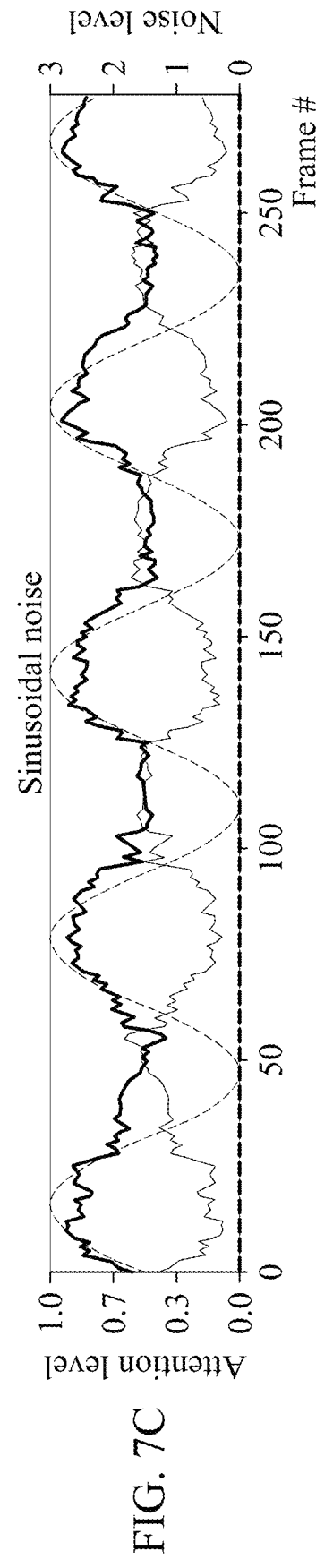

FIGS. 7A through 7C illustrate noise types not seen while training the double audio STAN model of FIGS. 6A through 6C. Referring to FIGS. 7A through 7C, attention responses to various noise conditions of the double audio STAN model trained using the TIDIGITS dataset are illustrated.

FIG. 7A illustrates a noise response to linear noise sweeps on the two audio sensors, FIG. 7B illustrates a noise response to noise bursts on a first audio sensor, and FIG. 7C illustrates a noise response to sinusoidal noise on a second audio sensor.

Although the noise conditions are not seen during training, the STAN model shows a desired negative correlation between noise level and attention, as in FIGS. 7A through 7C.

When the linear noise sweeps, the noise bursts, or the sinusoidal noise is added to features, attention modules may successfully focus attention to a sensor with a lower noise level.

In a situation in which noise levels of the two audio sensors are low as in the case of the noise bursts or the sinusoidal noise, the attention may settle in an equilibrium between sensors.

The STAN models may be evaluated against a baseline single sensor model and concatenation models. Testing may be performed on a clean variant and a noise corrupted variant of the TIDIGITS testset. With the clean testset, all available sensors may be presented with the same clean signal. With the noisy testset, each sensor data may be corrupted by unique random walk noise with a standard deviation between $[0, \ldots, 3]$. A result of the testing using the TIDIGITS datasets will be described later with reference to FIG. 8A.

Experiment on Transfer of Attention Module from TIDIGITS to WSJ Corpus Dataset

This experiment demonstrates the possibility of training a STAN model on a small dataset (for example, TIDIGITS) and reusing attention modules on a much bigger dataset (WSJ). An initial STAN model may be trained on the TIDIGITS corpus.

After training, a task-specific module of the STAN model may be replaced by an acoustic model trained on the WSJ corpus. A database may include a read speech from the "Wall Street Journal" magazine.

The 81-hour subset "si284" may be used as a training set of 37,000 sentences. The subset "dev93" may be used as a development set of 513 sentences. The subset "eval92" may be used as a testset of 330 sentences.

For both datasets, raw audio data may be converted to 123-dimensional filter bank features which include 40 filter banks, 1 energy term, and respective first and second order delta features.

The same frame size of 25 ms and the same frame shift of 10 ms may be used, resulting in longer sequences on WSJ. The features may be generated by preprocessing routines. Each feature dimension may be zero-mean and unit-variance normalized.

Models

The TIDIGITS-STAN model may use two audio sensors that provide filter bank features, transformation modules, and (60) GRUs per attention module followed by a one-unit non-flattening dense layer without non-linearity. A task-specific module on a top of a merge module may include a unidirectional two-layer (150,100) GRU network. The TIDIGITS-STAN model may use 266,544 parameters, with the task-specific module accounting for 200,062 parameters (75%).

A WSJ acoustic model, referred to as a WSJ baseline, may have 42 times more parameters (8.5M) than the task-specific module of the TIDIGTS-STAN model. The WSJ acoustic model may include 4 layers of bidirectional LSTMs with 320 units in each direction, followed by an affine transformation that maps outputs of last layers to 59 output labels.

The WSJ acoustic model may be character-based and map filter bank feature sequences to character sequences.

A WSJ-STAN model may be generated using the following method.

A TIDIGITS-STAN model may be trained.

A WSJ acoustic model may be trained.

A task-specific module of the TIDIGITS-STAN model may be replaced with the WSJ acoustic model. In this example, no fine tuning is performed at all on the WSJ-STAN model.

Training

Both a TIDIGITS testset and a WSJ testset may consider a sequence-to-sequence mapping task. In order to automatically learn alignments between speech frames and label sequences, a CTC objective may be adopted. All models may be trained with an ADAM optimizer for a maximum of 100 epochs, with early stopping preventing overfitting.

The TIDIGITS-STAN model may be trained on a noisy training set corrupted by the random walk noise described above.

Each sensor may receive a unique, independently drawn noise signal per training sample. A noise level of the random walks may vary between $[0, \ldots, 3]\sigma$. The WSJ acoustic model may be trained on a clean speech only.

Results

The WSJ-baseline model and the WSJ-STAN model may be evaluated on the "eval92" testset from the WSJ corpus. Table 3 shows evaluation results from the WSJ corpus. In detail, Table 3 shows word error rates (WERs) [%] after decoding a network output with a 3-gram language model based on weighted finite state transducers (WFSTs).

TABLE 3

| Model | WSJ-baseline | WSJ-STAN |
|---|---|---|
| Clean test set | 8.4 | 8.4 |
| Noisy test set | 53.5 | 26.1 |

For a clean speech test using a clean testset, the same clean signal may be used as inputs for two sensors of the WSJ-STAN model. Thus, the clean signal should be equivalent to the WSJ-baseline model in the clean test case. In Table 3, it may be seen that the WSJ-STAN model and the WSJ-baseline model both achieve a WER of 8.4% on a clean speech, which lies in the same estimate as other works, for example, a WER of 7.34%.

In a noisy test using a noisy testset, the input features may be overlaid with random walk noise with a noise level of up to $3\sigma$. In this example, an absolute WER of the WSJ-STAN model for sensor settings may be 26.1%, while the WSJ-baseline model may reach an absolute WER of 53.5%.

This result confirms that the STAN architecture may generalize an attention mechanism for different datasets by simply swapping out the task-specific module. It remains notable that the average number of frames per sample is 175 on the TIDIGITS testset, while it is 760 on the WSJ "eval92". The attention mechanism may still remain functional with much longer sequence lengths.

In addition, the WSJ-STAN model may be a hybrid of GRUs in the attention modules and LSTMs in the task-specific module.

Experiment on Correct Fusion from Multiple Sensors on Grid Dataset

The GRID corpus may be used for perceptual studies of speech processing. The GRID corpus may include 1,000 sentences spoken by each of 34 speakers. A GRID word vocabulary may include four commands ("bin", "lay", "place", "set"), four colors ("blue", "green", "red", "white"), four prepositions ("at", "by", "in", "with"), 25 letters ("A"-"Z" except "W"), ten digits ("0"-"9"), and four adverbs ("again", "now", "please", "soon"), resulting in 51 classes. For example, the GRID corpus may include 24,339 training samples and 2,661 test samples.

A GRID dataset may include audio data and video data. Raw audio data may be converted to MFCCs. For computation, a frame size of 60 ms, a frame shift of 40 ms, and 12 Mel spaced filter banks may be applied. Finally, an energy term as well as first and second order delta features may be appended, resulting in a 39-dimensional feature vector per frame.

The video frames may be converted to grey level frames. The audio data and the video data may be normalized to zero-mean and unit-variance on the whole dataset. As for the TIDIGITS dataset, a PER may be used as a performance metric.

Training

Video sequences and audio sequences of a GRID database may consider a sequence-to-sequence mapping task. In order to automatically learn alignments between speech frames, video frames, and label sequences, a CTC objective may be adopted. Output labels may include 52 classes (vocabulary size+blank label). All models may be trained with an ADAM optimizer for a maximum of 100 epochs, with early stopping preventing overfitting.

All models may be trained on a noisy training set corrupted by the random walk noise described above. Each sensor may receive a unique, independently-drawn noise signal per training sample. A noise level of the random walks may vary between $[0, \ldots, 3]6$.

Models

A total of seven models may be evaluated by the GRID dataset, the seven models including five models that use audio inputs only, one model that uses video inputs only, and one model that uses audio and video inputs. A summary of the seven models is shown in Table 4.

TABLE 4

| Name | Architecture | Sensors | Transformation layers | Attention layers | Classification layers | Parameters |
| --- | --- | --- | --- | --- | --- | --- |
| Single Audio | Baseline | 1 Audio | (50) Dense | None | (200,200) GRU | 1030012 |
| Double Audio STAN | STAN | 2 Audio | (50) Dense | (20) GRU | (200,200) GRU | 1056654 |
| Triple Audio STAN | STAN | 3 Audio | (50) Dense | (20) GRU | (200,200) GRU | 1062955 |
| Double Concat | Concatenation | 2 Audio | (50) Dense | None | (200,200) GRU | 1108052 |
| Triple Concat | Concatenation | 3 Audio | (50) Dense | None | (200,200) GRU | 1170052 |
| Single Video | Baseline | 1 Video | CNN | None | (200,200) GRU | 1061126 |
| Audio Video STAN | STAN | 1 Audio, 1 Video | (50) Dense, CNN | (20) GRU | (200,200) GRU | 1071688 |

As shown in Table 4, all models may use a two-layer bidirectional GRU network with (200,200) units in each direction for a task-specific module.

Audio-only models may include a single audio baseline sensor model, two STAN models with two or three sensors, and two concatenation models with two or three sensors. Every audio sensor may use a (50) unit non-flattening dense layer without non-linearity for feature transformation.

For the STAN models, attention modules may operate on the transformed features and use (20) GRUs per sensor. Outputs thereof may be converted to one scalar attention score per frame by a non-flattening dense layer without non-linearity.

A video-only model may use a CNN for feature transformation, the CNN including three convolutional layers of 5×5×8 (5×5 filter size, 8 features), each followed by a 2×2 max pooling layer. An output of the CNN may be flattened and presented to a task-specific module.

The combined audio and video STAN model may use the same audio and video transformation modules as the corresponding single modality model variants. Similar to the STAN model, (20) GRUs may be used for each sensor of the attention module.

Results

The seven previously described models may be compared by PERs thereof on the GRID testset. The testing may be performed on a clean variant and a noise corrupted variant of the testset. With the clean testset, all sensors of the same modality may present the same clean signal. With the noisy testset, each sensor data may be corrupted by unique random walk noise with a noise level between [0, . . . , 3] σ. A result of the testing using the GRID testset will be described later with reference to FIG. 7B.

All of the audio-only models may achieve comparably low PER of around 5% on the clean testset, although being trained on noisy conditions. The STAN architecture may not have negative implications for clean signals.

On the noisy testset, the audio STAN models may outperform concatenation models by 13% (two sensors) and 17% (three sensors).

Adding more sensors to the STAN models may comparatively lower the PER by 48% (single vs. double audio sensors) and 58% (single vs. triple audio sensors). The single video baseline model may perform worse than the single audio baseline model on both clean and noisy test conditions. The audio modality may be a more informative modality. However, a fusion of both modalities with the STAN architecture may improve PER scores even beyond PER stores of the audio-only models.

Figure 8A:
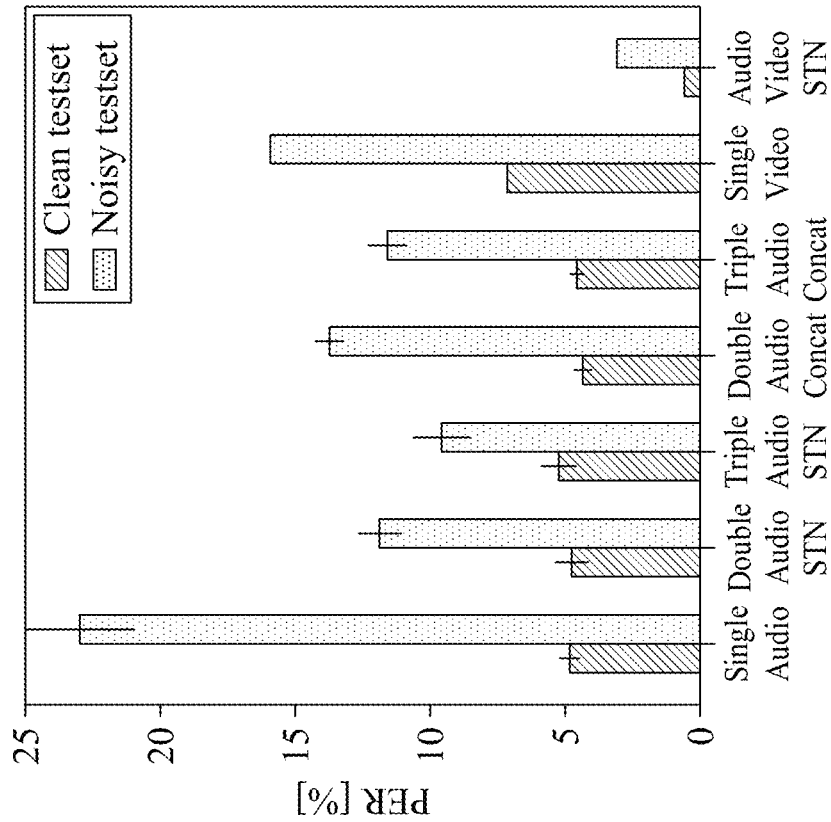
FIGS. 8A and 8B illustrate a mean phrase error rate (PER) of different weight initializations on different datasets to be applied to STAN models according to exemplary embodiments.
Figure 8B:
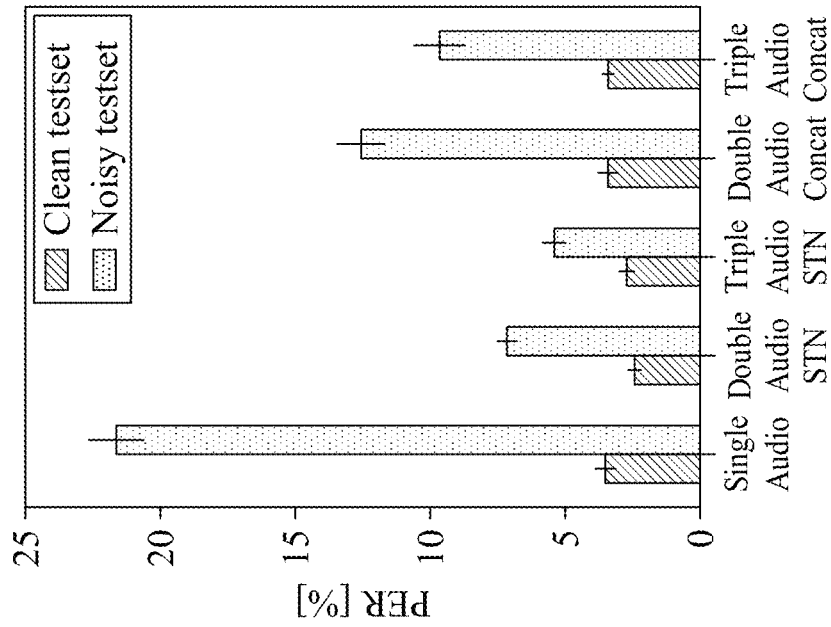

FIGS. 8A and 8B illustrate a mean PER of different weight initializations on different datasets to be applied to STAN models according to exemplary embodiments. FIG. 8A illustrates a mean PER of five different weight initializations on the TIDIGITS dataset for clean and noisy testsets. FIG. 8B illustrates a mean PER of five different weight initializations on the GRID datasets for clean and noisy testsets.

All STAN models may achieve a comparably low PER of around 3% on the clean testset, although being trained on noisy conditions. The STAN architecture may not have negative implications for clean signals. Referring to FIGS. 8A and 8B, with the noisy testset, the STAN models with two and three sensors exhibit the best performance. The STAN models may comparatively lower the PER by 66.8% (single vs. double sensors) and 75% (single vs. triple sensors).

When compared to the concatenation models and the same number of sensors, the STAN models may achieve around half the PER. As can be seen, the STAN architecture is superior and the dynamic sensor tuning helps in noisy conditions. In FIGS. 8A and 8B, the worse result of the concatenation models may indicate that the network has difficulties in prioritizing signal sources with lower noise levels during classification.

Figure 9:
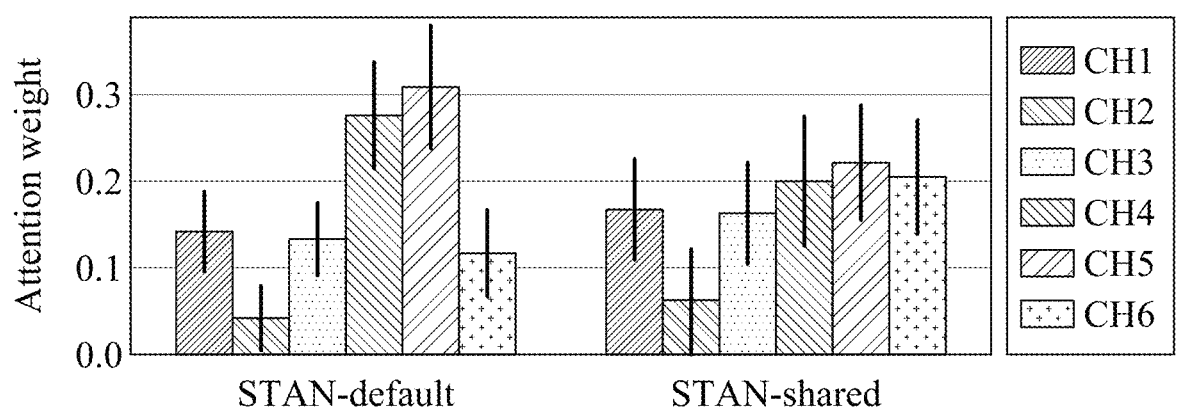
FIG. 9 illustrates a result of examining multi-channel speech recognition with natural noise in STAN models according to an exemplary embodiment.

FIG. 9 illustrates a result of examining multi-channel speech recognition with natural noise in STAN models according to an exemplary embodiment. Referring to FIG. 9, attention weights per channel averaged over all environments on "et05_real", CHiME-3, are illustrated.

Two STAN variant models may attribute the lowest attention to channel 2 (backward channel). For channels 1, 3, 4, 5 and 6, a STAN-shared model may spread attention more equally than a STAN-default model, which appears to prefer the channels 4 and 5.

Dataset

In a final experiment, STAN models may be evaluated on the CHiME-3 corpus, which considers a multi-channel automatic speech recognition (ASR) experiment with real-world noisy speech. The corpus may provide real and simulated noisy speech data from four environments: a café (CAF), a street junction (STR), public transport (BUS) and a pedestrian area (PED).

The noisy speech data includes 6-channel recordings of sentences from the WSJ0 corpus spoken in the four environments. For recording, a tablet device with six microphones was used, with five microphones facing towards a speaker and one microphone facing away from the speaker (backward channel). The simulated data is also multi-channel and was constructed by mixing clean samples of WSJ0 with environment background recordings.

For training, both real (1,600 samples, "tr05_real") and simulated (7,138 samples, "tr05_simu") noisy speech data was used.

For testing, real noisy speech data ("et05_real") was used in order to evaluate STAN models on natural noise. The samples were preprocessed into 123-dimensional filterbank features (40 Mel-spaced filterbanks, energy coefficient, 1st and 2nd order delta features, 25 ms frames, 10 ms frame shift) and normalized to zero-mean and unit variance per sample.

Models

Two STAN variant models may be compared against one sensor concatenation model. Both STAN variants may use six sensors (one for each microphone channel) and identity (ID) transformation modules.

Each sensor may have an attention module including 20 LSTM units followed by 1 dense unit with a SELU non-linearity (an arbitrary choice, as leaky ReLUs worked as well).

Parameters of the attention modules may be either shared across sensors or not shared across sensors. A STAN-shared model may share the parameters of the attention modules across the sensors, and a STAN-default model may not share the parameters of the attention modules across the sensors.

The concatenation model may concatenate all six input sensors into a 738-dimensional feature representation.

For classification, the STAN variant models and the concatenation model may use four layers of bidirectional LSTMs units with 350 units in each direction, followed by an affine transform to 59 output classes (characters+blank label). The network output may be decoded with a trigram language model based on weighted finite state transducers (WFSTs).

The STAN variant models may be compared against the CHiME-3 official DNN/HMM hybrid baseline model that uses 27M parameters (twice as much as the STAN variant models) and a more complex training procedure (for example, phoneme labels, forced alignment with GMM/HMM, maximum likelihood linear transform (MLLT), feature-space maximum likelihood linear regression (fMLLR) transform, or state-level minimum Bayes risk (sMBR) criterion).

Training

A CTC objective may be used to automatically learn the alignments between speech frames and label sequences.

All STAN models may be trained with the ADAM optimizer for 150 epochs, selecting a model with lowest WER for evaluation. For regularization, Gaussian noise on the inputs ($\mu$=0, $\sigma$=0:6), dropout (p=0.3) and weight decay (1e-4) may be applied.

WER [%] in the environments BUS, CAF, PED and STR and by average on "et05_real", and CHiME-3 parameters are shown in Table 5. The best result is shown as underlined.

TABLE 5

| Model | BUS | CAF | PED | STR | Ave. | Parameters |
| --- | --- | --- | --- | --- | --- | --- |
| DNN/HMM hybrid | 51.8 | 34.7 | <u>27.2</u> | <u>20.1</u> | 33.4 | 27.01M |
| STAN-default | <u>41.5</u> | <u>33.4</u> | 28.4 | 22.6 | <u>31.5</u> | 13.22M |
| STAN-shared | 43.4 | 33.7 | 28.8 | 22.5 | 32.1 | 13.17M |
| Concatenation | 43.4 | 33.6 | 30.9 | 24.5 | 33.1 | 14.94M |

Results

As shown in Table 5, CTC models may perform better than the baseline DNN/HMM hybrid in terms of average WER by about 0.9% (concatenation model), 3.9% (STAN-shared model) and 5.9% (STAN-default model).

The two STAN variant models, for example, the STAN-shared model and the STAN-default model, may outperform the concatenation model. For further analysis, the function of the STAN attention modules may be verified and a comparison against the concatenation models may be described later.

Attentional Mechanism on Natural Noise

FIG. 9 illustrates an average attention weight for each channel over the whole evaluation set "et05_real". Channel 2 faces away from the speaker and generally has a lower SNR than the other channels. On average, the two STAN variant models attribute the lowest weight to channel 2. This result demonstrates two key features of the STAN variant models.

Firstly, the STAN models may tune their attention towards more useful sensors even on real-world noisy data.

Secondly, the output of the attention modules may be highly informative, clearly indicating a sub-optimal sensor.

Avoiding channel 2 may be an easier task for the STAN-default model, as the channel 2 attention module may be trained in a way that it constantly outputs lower attention weights. The STAN-shared model may differentiate between channel 2 and the remaining channels.

Within the shared parameter space of the attention modules, this may be a harder task than for the STAN-default model, as the shared attention module may need to be trained to simultaneously compute a high attention score on a sensor with high SNR and a low attention score on a sensor with low SNR, even in the presence of natural noise.

For the front-facing channels (for example, channels 1, 3, 4, 5 and 6), the STAN-shared model may attribute similar attention weights, while the STAN-default model prefers channels 4 and 5.

Figure 10:
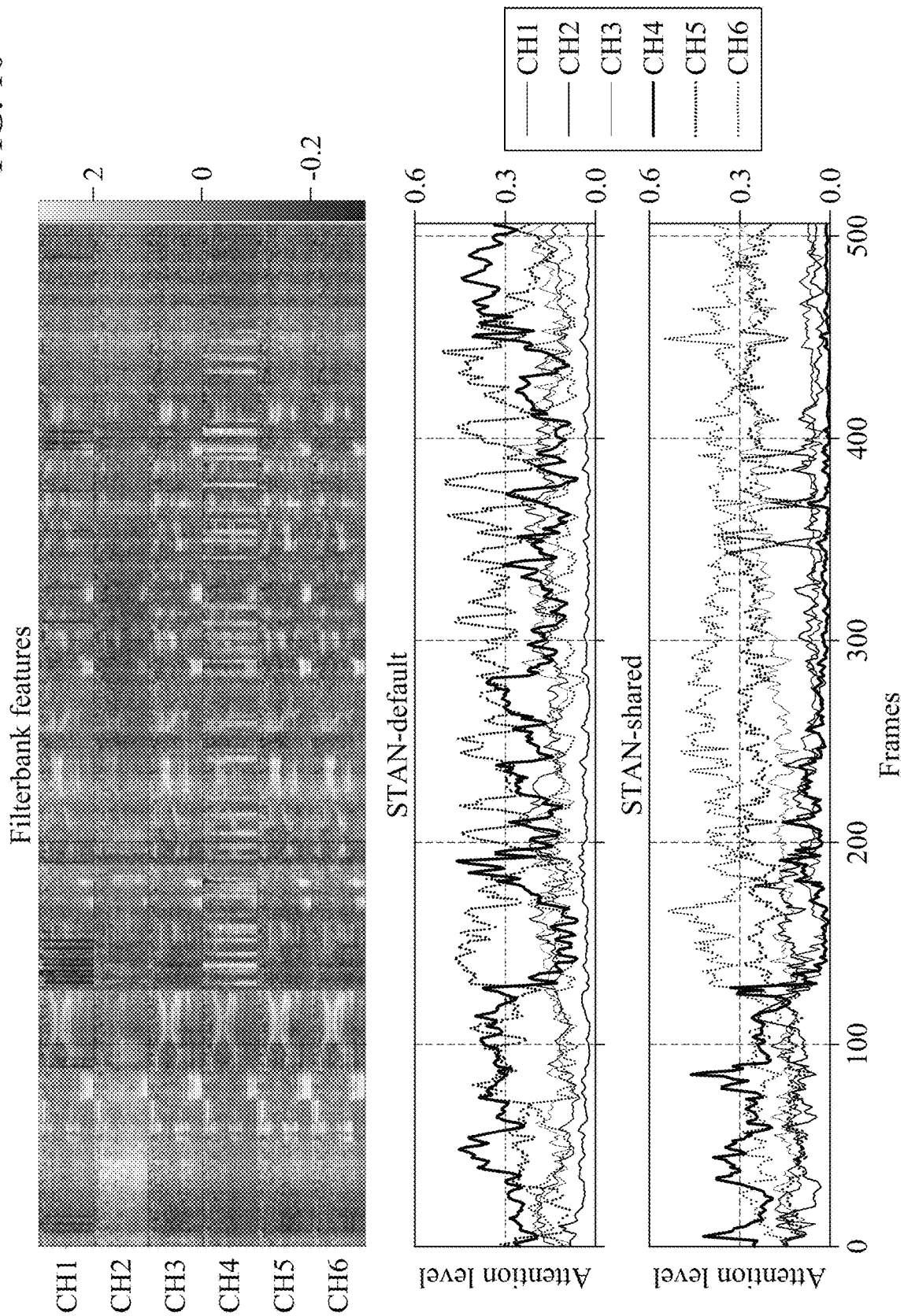
FIG. 10 illustrates filter bank features of the sample "'M05_443C020Q_BUS" from CHiME-3 and attention responses of a STAN-default model and a STAN-shared model according to an exemplary embodiment.

FIG. 10 illustrates filter bank features of the sample "'M05_443C020Q_BUS" from CHiME-3 and attention responses of a STAN-default model and a STAN-shared model according to an exemplary embodiment. In FIG. 10, different channels are illustrated using different types of lines.

For better visibility of channel differences, a features plot may be clipped to a range of "–3" to "3". An attention value generally follows a signal quality, with clear suppression of the attention on channels 1, 2 and 4. Note how the attention value on channel 4 is initially high, but is then suppressed when the channel is temporarily corrupted after frame 120. The attention response of the STAN-shared model may be more interpretable.

Six channels and attention weights may be plotted for a sample that suffers channel corruption on multiple channels (for example, channels 1, 2 and 4) of FIG. 10.

By looking at attention signals of the sample, it may be observed that the two STAN models may dynamically tune an attention level of each sensor, as depicted by the lowering of attention on a sensor that is temporarily corrupted (channel 4 after frame 120) and the continuous suppression of the other corrupted channels 1 and 2.

In general, attention weights of the STAN-shared model are more interpretable than those of the STAN-default model.

Effectiveness of Attentional Mechanism

With the ability of STAN models to reduce attention to corrupted channels, the question remains why the STAN models only achieved 3.0% to 4.9% lower WERs than the concatenation model. This may be explained by a closer look at the CHiME-3 dataset.

The STAN models may be trained based on simulated data (7,138 samples) and real data (1,600 samples). The CHiME dataset shows that 12% of real recordings suffer channel corruption (for example, hardware issues, masking by hands or clothes). With such a small portion of corrupted samples, a standard model without sensory attention (for example, the concatenation model) may still be expected to perform well overall. To test this hypothesis, the performance may be assessed as the corruption of samples.

The CHiME testset provides a table ("mic_error.csv") where, for each real sample, cross correlation coefficients of all six channels relative to a reference close-talk microphone is given.

Rather than zeroing out the channels, the channels may be removed from a computation graph. Such a flexibility may be much harder to achieve for a concatenation model, as a disabled channel may change the input size of the network. The results are shown in Table 6.

TABLE 6

| Model | Base | Single channel removed | | | | | | Multiple channels removed | | | |
| --- | --- | --- | --- | --- | --- | --- | --- | --- | --- | --- | --- |
| | | CH1 | CH2 | CH3 | CH4 | CH5 | CH6 | CH1/2 | CH1/2/3 | CH1/2/3/4 | CH1/2/3/4/5 |
| STAN-default | 31.5 | 32.1 | 30.9 | 31.9 | 32.6 | 33.3 | 32 | 31.6 | 32.2 | 34.1 | 39.7 |
| STAN-shared | 32.1 | 32.5 | 31.2 | 32.4 | 33 | 33.3 | 33.2 | 31.8 | 32.3 | 33.9 | 39.9 |

Based on this table, a standard deviation across the cross correlation coefficients may be computed for each sample. A high standard deviation may correspond to a high likelihood of at least one channel being different (that is, corrupted), which may allow establishment of a ranking of potentially corrupted samples. The ranking may be verified by listening tests and may be considered as a solid indicator of corrupted samples.

As a metric, a partial WERi may be used. The partial WERi may be a WER including i highest ranked samples in the corruption ranking.

A result of using the partial WERi may be shown for each of the "et05_real" environments of FIG. 11, with the WERi of the STAN models given relative to the concatenation models.

Figure 11A:
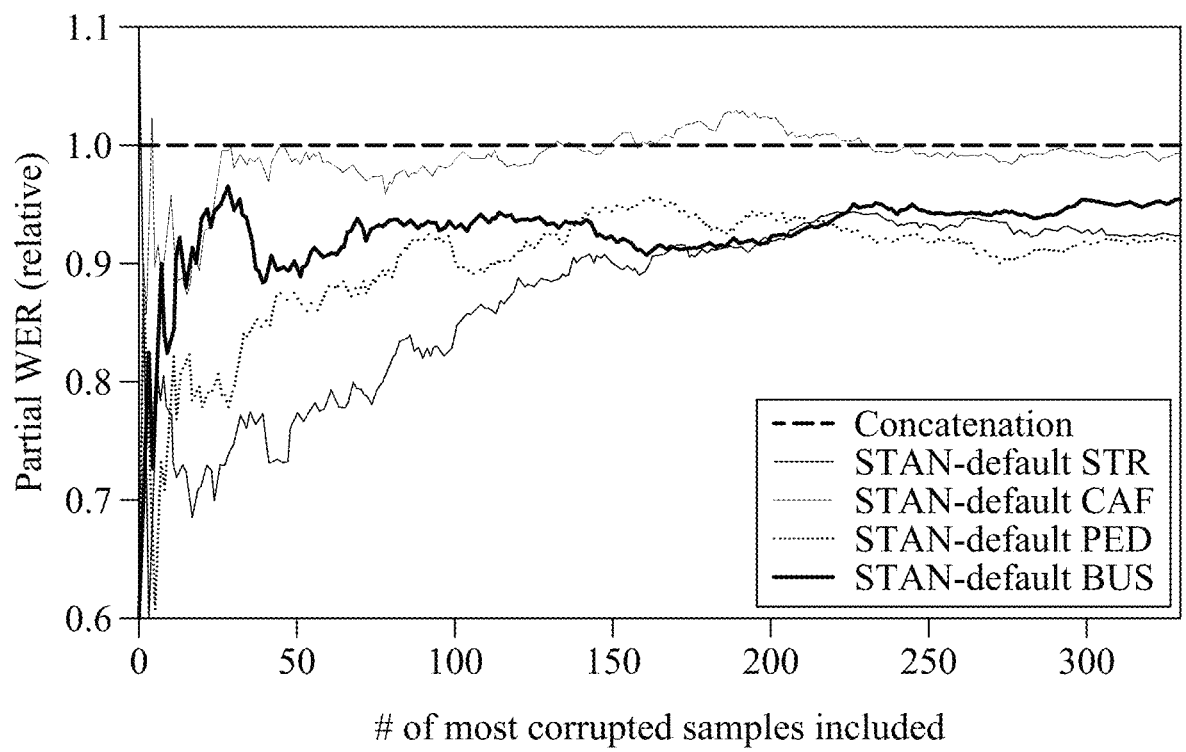
FIG. 11A illustrates a partial word error rate (WER) computed up to the number of most corrupted samples for a STAN-default model.
Figure 11B:
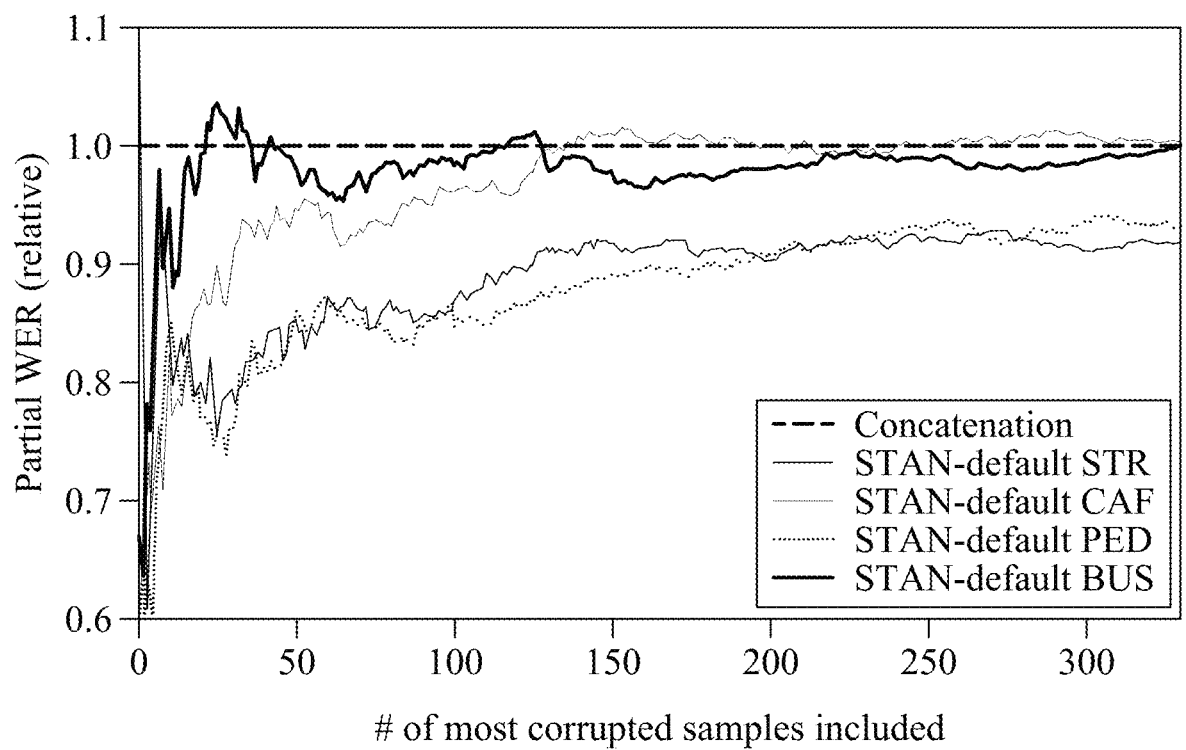
FIG. 11B illustrates a partial WER computed up to the number of most corrupted samples for a STAN-shared model, according to an exemplary embodiment.

FIG. 11A illustrates a partial WER computed up to the number of most corrupted samples for a STAN-default model, and FIG. 11B illustrates a partial WER computed up to the number of most corrupted samples for a STAN-shared model. Results may be shown for each of the "et05_real" environments in FIGS. 11A and 11B. The WER may be given relative to the concatenation model. The advantage of the STAN models may be especially large if samples suffer channel corruption.

In FIG. 11, it may be learned that for a higher share of corrupted samples (that is, fewer samples included), the STAN models may perform significantly better than concatenation models.

When including 50 most corrupted test samples of each environment, $WER_{50}$ of the STAN-default model is reduced comparatively by 12%, and $WER_{50}$ of the STAN-shared model is reduced comparatively by 9%. When looking at single environments, the relative $WER_{50}$ reduction may grow larger on STR environment (23%, the STAN-default model) and PED environment (14%, the STAN-shared model). On the CAF and BUS environments, the STAN models still perform better, but to lesser extent.

Samples from the latter two subsets are generally less susceptible to channel corruption, as these environments may be more controlled (if, for example, the speaker is seated and has better grip of the tablet without masking, and no wind blows).

Robustness to Channel Removal

Due to the modular architecture of the STAN models, the STAN models are highly flexible with respect to sensor configurations. This is demonstrated by a channel removal experiment, in which between one and five channels are removed on a STAN model trained with all six channels. After removal, no additional training is allowed. Therefore, a sensor merge module may only see the remaining active channels.

Table 6 shows a WER [%] when a single channel or multiple channels are removed at a time on the CHiME-3 dataset.

In a first phase, one channel is removed at a time.

For all channels except channel 2, the WER increases by up to about 5.7% (channel 5 on the STAN-default model). It is noted that channel 5 was the preferred channel of the STAN-default model, so even when removing the preferred channel of the STAN variant models, the STAN model is capable of exploiting the remaining channels with an acceptable performance. Removing channel 2 (the backward channel) decreases the WER by about 2% on the STAN variant models.

In a second phase, multiple channels are removed in a sequential manner, starting with channels 1 and 2. For example, for up to three removed channels (channels 1, 2 and 3), the WER remains stable within 2% of the six-channel STAN models.

With five removed channels (channels 1 through 5), the WER increases comparatively by up to 26%. While this is a clear deterioration of the performance, the performance still does not fully collapse.

When removing sensors, it may be observed that a standard deviation of merged representation increases with the number of removed sensors from around $\sigma=0:85$ (all channels active) to $\sigma=1$ (one channel active), which may push the network out of its preferred operating range and consequently cause the performance loss.

The units described herein may be implemented using hardware components and software components. For example, the hardware components may include microphones, amplifiers, band-pass filters, analog to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purposes of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device capable of providing instructions or data to or being interpreted by the processing device. The software also may be distributed over network coupled computer systems so that the software is stored and executed in a distributed fashion. The software and data may be stored by one or more non-transitory computer readable recording mediums.

A method according to the above-described exemplary embodiments may be recorded in non-transitory computer-readable media including program instructions to implement various operations of the above-described exemplary embodiments. The media may also include, alone or in combination with the program instructions, data files, data structures, and the like. The program instructions recorded on the media may be those specially designed and constructed for the purposes of exemplary embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described exemplary embodiments, or vice versa.

A number of exemplary embodiments have been described above. Nevertheless, it should be understood that various modifications may be made to these exemplary embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A sensor transformation attention network (STAN) model, comprising:
   a plurality of sensors configured to collect input signals; and
   one or more processor configured to implement:
      a plurality of attention modules configured to calculate attention scores respectively corresponding to feature vectors respectively corresponding to the input signals;
      a merge module configured to calculate attention values of the attention scores, respectively, and generate a merged transformation vector based on the attention values and the feature vectors; and
      a task-specific module configured to classify the merged transformation vector,
   wherein each of the attention modules corresponds to one of the plurality of the sensors, respectively, and the attention scores of the attention modules have a negative correlation with noise levels of the plurality of sensors,
   wherein the merge module is further configured to generate the merged transformation vector by scaling the feature vectors based on the corresponding attention values, and by merging the scaled feature vectors using an adding operation.

2. The STAN model of claim 1, wherein the input signals comprise at least one of a raw signal and a preprocessed signal, the raw signal corresponding to at least one of an audio feature and a visual feature, and the preprocessed signal corresponding to at least one of the audio feature and the visual feature.

3. The STAN model of claim 1, wherein the input signals are partitioned on a frame-by-frame basis based on a time series.

4. The STAN model of claim 1, wherein each of the plurality of sensors operates according to a same modality.

5. The STAN model of claim 1, wherein the plurality of sensors comprises at least one sensor operating according to a first modality and at least one sensor operating according to a second modality, different from the first modality.

6. The STAN model of claim 1, wherein each of the attention modules is configured to calculate one scalar attention score per frame of the feature vectors.

7. The STAN model of claim 1, wherein the noise levels are based on at least one of artificial noise and natural noise.

8. The STAN model of claim 1, wherein the attention modules comprise at least one of a fully-connected neural network (FCNN), a convolutional neural network (CNN), and a recurrent neural network (RNN).

9. The STAN model of claim 1, wherein the merge module is further configured to calculate the attention values through sequence-to-sequence mapping on a time series, and to thereby generate the merged transformation vector.

10. The STAN model of claim 1, wherein the task-specific module comprises at least one of a fully-connected neural network (FCNN), a convolutional neural network (CNN), and a recurrent neural network (RNN).

11. The STAN model of claim 1, wherein the task-specific module comprises two layers of bidirectional gated recurrent units (GRUs) and a long short term memory (LSTM).

12. The STAN model of claim 1, wherein the one or more processor is further configured to implement:
   a plurality of transformation modules configured to transform the input signals into the feature vectors by mapping the input signals to a feature space.

13. The STAN model of claim 12, wherein the plurality of transformation modules are connected to the plurality of attention modules and to the merge module.

14. The STAN model of claim 12, wherein the transformation modules comprise at least one of a fully-connected neural network (FCNN), a convolutional neural network (CNN), and a recurrent neural network (RNN).

15. The STAN model of claim 14, wherein the transformation modules comprise a convolutional neural network (CNN), and
   wherein the CNN comprises:
      a plurality of convolutional layers for transformation of the feature vectors; and
      a plurality of max pooling layers respectively corresponding to the plurality of convolutional layers.

16. The STAN model of claim 12, wherein the merge module is further configured to generate the merged transformation vector by scaling the feature vectors based on the corresponding attention values, and merging the scaled feature vectors using an adding operation.

17. The STAN model of claim 12, wherein the plurality of transformation modules are connected to the plurality of sensors and are configured to receive the input signals, respectively, and
each of the plurality of transformation modules is connected to the merge module together with one of the plurality of attention modules.

18. The STAN model of claim 12, wherein the plurality of transformation modules comprise a plurality of first transformation modules and a plurality of second transformation modules configured to receive the input signals from the plurality of sensors,
the plurality of first transformation modules are connected to the plurality of attention modules, respectively, and
the plurality of second transformation modules are connected to the merge module.

19. The STAN model of claim 12, wherein the plurality of transformation modules are directly connected to the merge module.

20. The STAN model of claim 1, wherein the STAN model is trained based on a training set in which noise sampled from normally and uniformly distributed random noise using a noise model is mixed with the input signals.

21. A sensor transformation attention network (STAN) model, comprising:
a plurality of sensors configured to collect input signals; and
one or more processor configured to implement:
a plurality of attention modules configured to calculate attention scores respectively corresponding to feature vectors respectively corresponding to the input signals;
a merge module configured to calculate attention values of the attention scores, respectively, and generate a merged transformation vector based on the attention values and the feature vectors; and
a task-specific module configured to classify the merged transformation vector,
wherein each of the attention modules corresponds to one of the plurality of the sensors, respectively,
wherein the attention scores of the attention modules have a negative correlation with noise levels of the plurality of sensors,
wherein the STAN model is trained based on a training set in which noise sampled from normally and uniformly distributed random noise using a noise model is mixed with the input signals,
wherein the noise model comprises a random walk noise model, and
wherein the plurality of sensors are further configured to each receive a unique, independently drawn noise signal per training sample based on the random walk noise model.

22. A sensor transformation attention network (STAN) model, comprising:
a plurality of sensors, each configured to collect an input signal;
a memory storing software and a processor which configured to execute the software and thereby configure:
a plurality of attention modules, respectively corresponding to the plurality of sensors, wherein each of the plurality of attention modules calculates an attention score of a feature vector corresponding to the input signal;
a merge module which calculates an attention value of each attention score and generates a merged transformation vector based on each attention score and each feature vector; and
a task-specific module which classifies the merged transformation vector,
wherein each of the attention modules corresponds to one of the plurality of the sensors, respectively, and
the attention scores of the attention modules have a negative correlation with noise levels of the plurality of sensors,
wherein the merge module is further configured to generate the merged transformation vector by scaling the feature vectors based on the corresponding attention values, and by merging the scaled feature vectors using an adding operation.

* * * * *